Jan. 24, 1933.  S. H. DURBIN  1,895,411
TRANSFER CONVEYER
Filed June 19, 1931   5 Sheets-Sheet 1

INVENTOR
Stanley H. Durbin
BY
Philip P. Liggers
ATTORNEY

Jan. 24, 1933.  S. H. DURBIN  1,895,411
TRANSFER CONVEYER
Filed June 19, 1931  5 Sheets-Sheet 2

Fig.2

INVENTOR
Stanley H. Durbin
BY
Philip F. Siggers
ATTORNEY

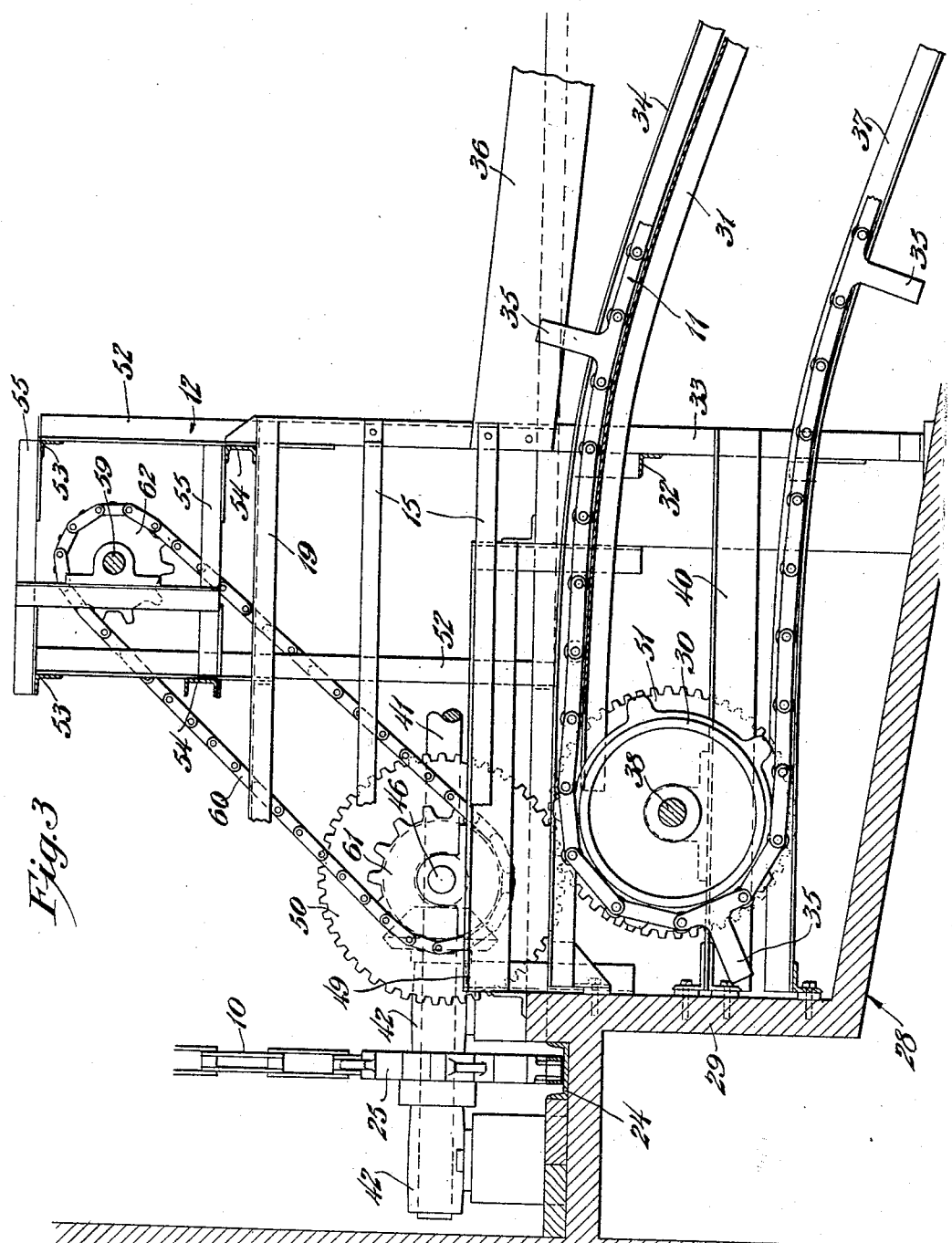

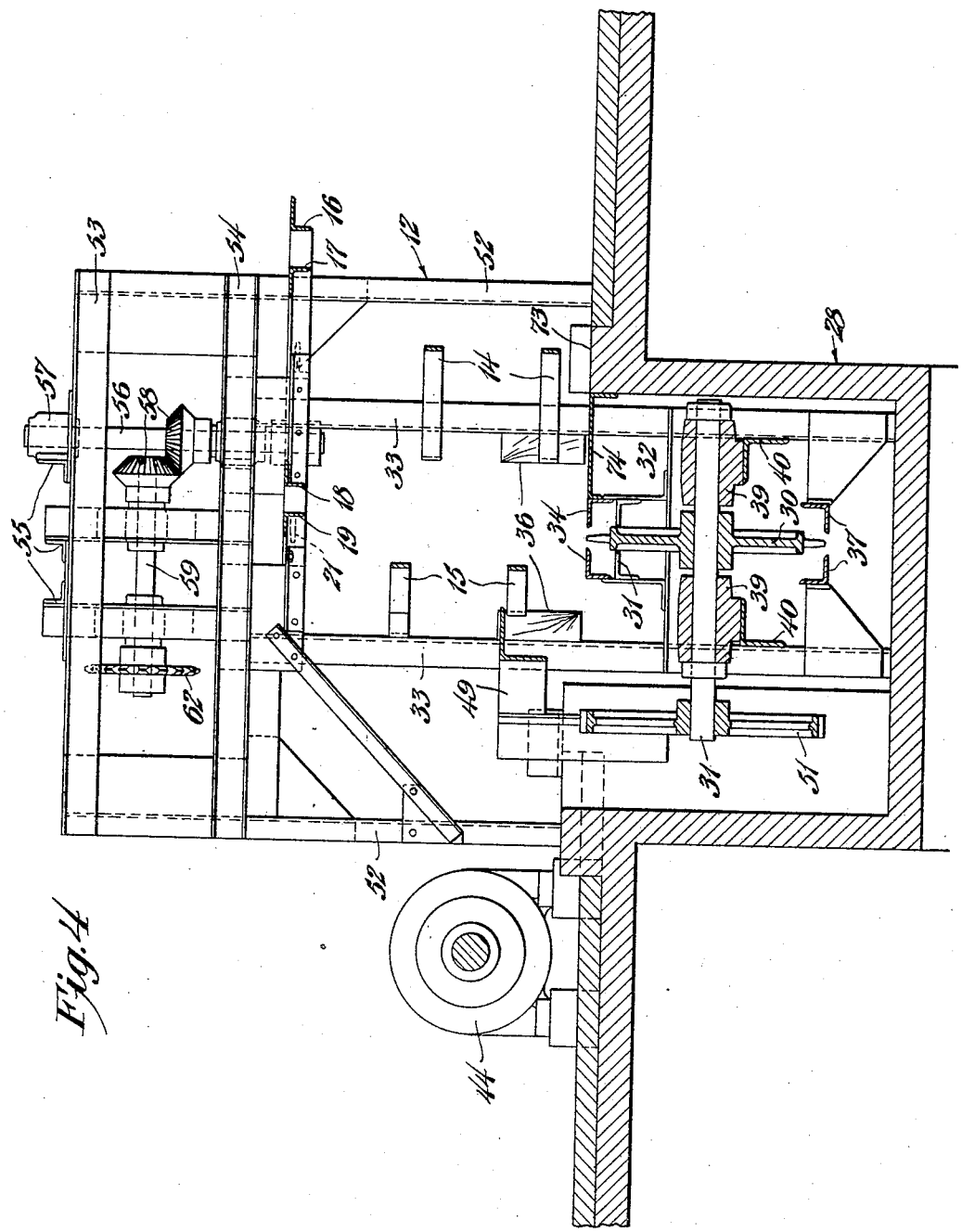

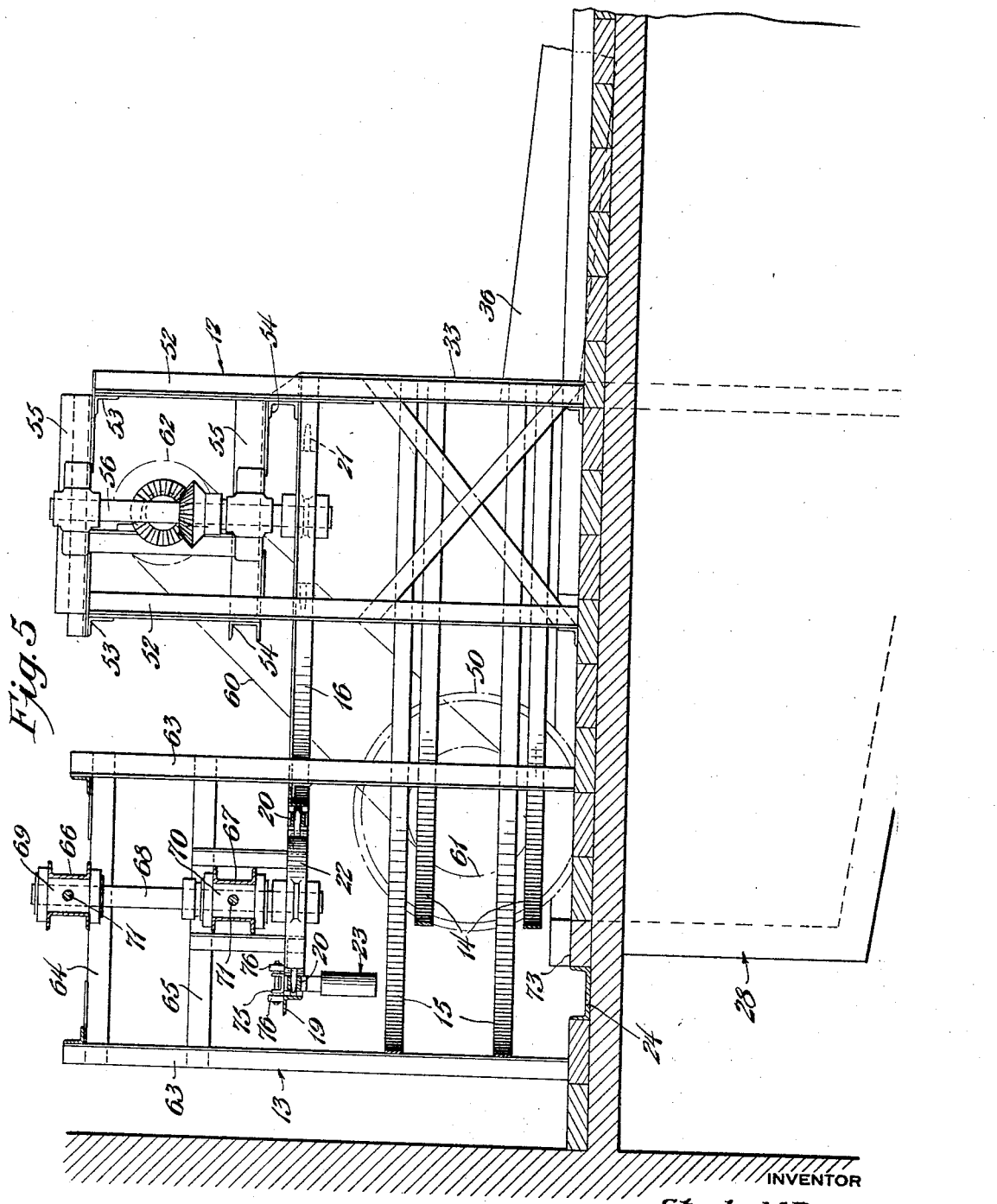

Patented Jan. 24, 1933

1,895,411

UNITED STATES PATENT OFFICE

STANLEY H. DURBIN, OF HUDSON, NEW YORK, ASSIGNOR TO GIFFORD-WOOD COMPANY, OF HUDSON, NEW YORK, A CORPORATION OF NEW YORK

TRANSFER CONVEYER

Application filed June 19, 1931. Serial No. 545,516.

This invention relates to transfer conveyers and, among other objects, aims to provide an improved conveyer designed to transfer articles from one conveyer to another when the conveyers are at an angle to each other.

In the accompanying drawings showing a preferred embodiment of the invention:—

Fig. 2 is a plan view of the transfer conveyer and the adjacent portions of the other conveyers;

Fig. 3 is a vertical sectional view taken on the line 3—3 of Fig. 2;

Fig. 4 is a vertical sectional view taken on the line 4—4 of Fig. 2;

Fig. 5 is a vertical sectional view taken on the line 5—5 of Fig. 2;

Fig. 6 is a sectional view taken on the line 6—6 of Fig. 2; and

Fig. 7 is a sectional view taken on the line 7—7 of Fig. 6.

Figure 1:
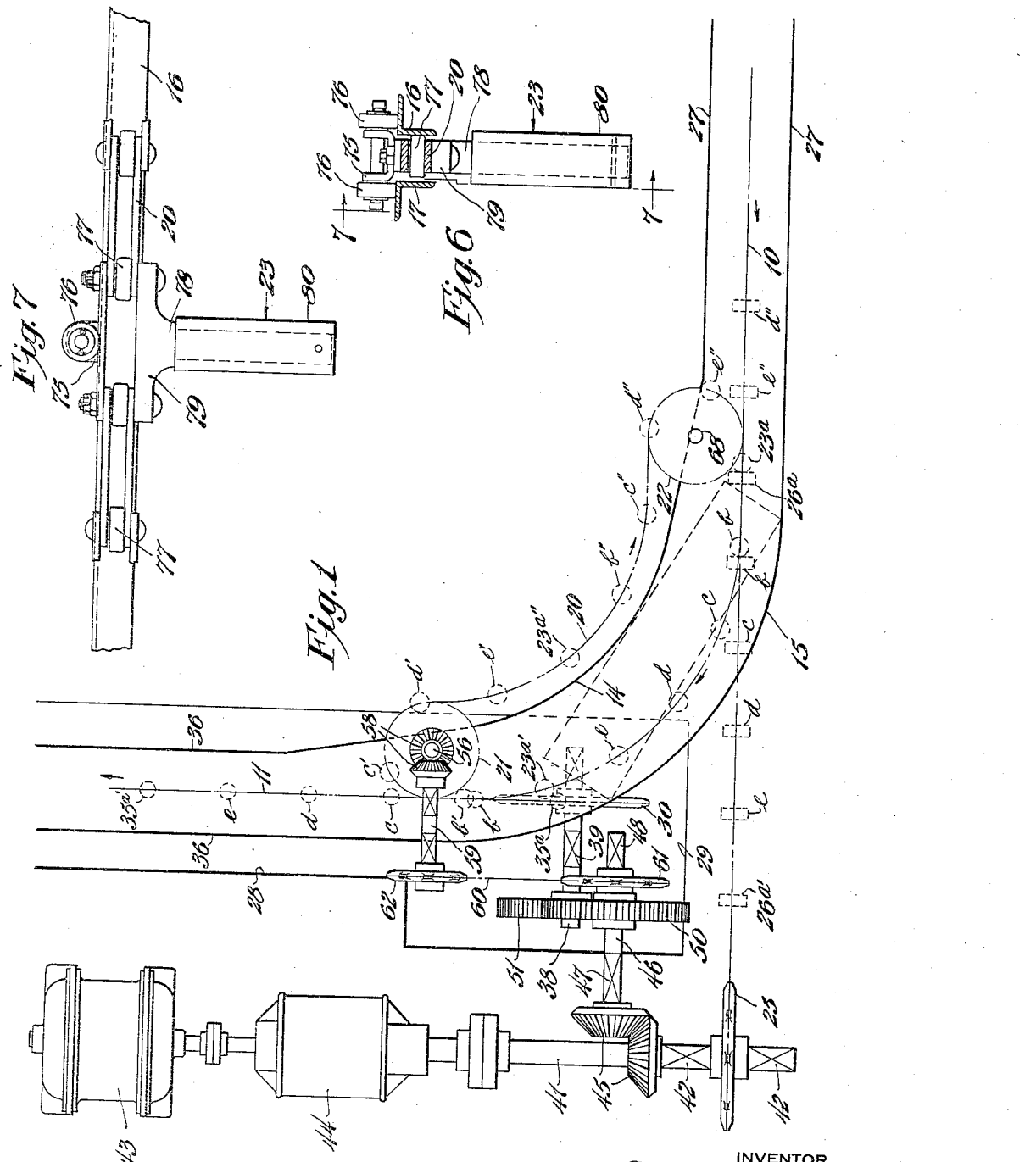
Fig. 1 is a diagrammatic plan view of a conveyer installation.

In conveying articles from one part of a building to another, it is frequently necessary that the direction of travel of the articles be changed; and to effect this, several endless conveyers are arranged at angles to each other and the articles are transferred from one conveyer to another. This is particularly true in ice plants, where the conveyers often extend parallel to adjacent walls on the same floor, or where the ice cakes are carried by one conveyer along the floor and then are transferred to a decline conveyer at an angle to the first conveyer to deliver ice to the floor below. Heretofore, to transfer articles from one conveyer to another at an angle, either manual labor or gravity run transfers have been employed, the ice being delivered, in the latter case, from the end of one conveyor onto a curved slide over which the ice moves by gravity to the next conveyer. In most cases such an arrangement is unsatisfactory because ice jams and breakage occur at the point of transfer and it is usually considered desirable to station a man at this point to supervise transfer of the ice. Moreover, in using a gravity run, the first conveyer must necessarily be at a higher elevation than the second, which is not always convenient and sometimes is impossible, in a particular plant.

In accordance with the invention, the transfer means is a mechanically driven conveyer synchronized with the other conveyers, which are or may be on the same level, so that no labor or supervision is required at the transfer point. In fact, by using the present transfer conveyer at the adjacent ends of several conveyers, it is possible to convey ice from any part of the plant to any other part without any labor other than that of placing the ice on the first conveyer. The same result may be obtained when conveying many articles besides ice cakes.

Referring particularly to Figs. 1 and 2, the transfer conveyer is there shown arranged to transfer ice cakes or other articles from a single-chain endless conveyer 10 to a decline conveyer 11, which is at right angles, delivering the ice to the floor below. The transfer conveyer comprises, in general, two steel frames 12 and 13 (Fig. 2) which support curved ice guides 14 and 15; chain-supporting guides 16, 17, 18 and 19; and an endless chain 20 mounted above the ice on said guides and trained over sprockets 21 and 22, and having depending flights 23 to engage the rear ends of the ice cakes.

In this instance, the main conveyer 10 is shown as being of the roundabout type, that is, the lower run travels slightly below the level of the floor in a channel 24, passing around a drive sprocket 25 at the discharge end of the run and returning to the other end. The flights 26 on the conveyer 10 project above the level of the floor to engage the ice cakes which slide along the surface of the floor between guide members 27.

The decline conveyer 11, as shown in Fig. 3, is arranged with its major portion below the level of the floor in a depending housing 28 which is open at the top. See also Fig. 4. The upper side and end walls of the housing project slightly above the floor level to form a curbing, the upper end wall 29 being adjacent the discharge end of conveyer 10. The decline conveyer 11 is trained around a drive sprocket 30 at its upper end and its upper run moves on a pair of inclined channel members 31 (Figs. 3 and 4) leading to the floor below, said channels being supported near their upper ends on a cross bar 32 connected between upright members 33 which extend upwardly from the bottom of the housing 28. Ice slides in the form of spaced angle members 34 are arranged on either side of the conveyer 11, being above and in parallel relation to the channels 31. The upper portions of the slides 34, which are secured to the end wall 29, are substantially flush with the floor. Flights 35 on the conveyer project upwardly between the slides, and engage the forward ends of the ice cakes to retard their movement as they move by gravity down the ice slides 34 between guide members 36. The lower or return run of the conveyer travels on spaced angle members 37 which are secured at their upper ends to the end wall 29 and the uprights 33. The slides 34 and 31 are also supported on the cross bar 32 and uprights 33 respectively. The sprocket 30 is secured on a shaft 38 journaled in bearings 39, which are mounted on angle members 40 secured at their ends to the wall 29 and to uprights 33.

The drive sprocket 25 of the conveyer 10, as shown in Figs. 1 and 3, is secured on a shaft 41 journaled in bearings 42 supported above the floor and at one side of the open housing 28. The shaft 41 may be driven by any suitable means, such as a motor 43, and a speed reduction gearing 44. The decline conveyer 11 is driven from shaft 41 by means of bevel gears 45 on shaft 41 and on a jack shaft 46 extending over the open end of the housing and journaled in bearings 47 and 48 mounted respectively on the curbing and on a structural member 49 extending at an angle across the top of the housing. A gear 50 on shaft 46 meshes with a gear 51 secured on shaft 38, to which drive sprocket 30 for the decline conveyer is secured. Both of the bevel gears 45 are the same size as are the gears 50 and 51 so that both conveyers 10 and 11 are driven at the same speed.

Returning to the transfer conveyer, the frame 12 is shown as being made of suitable structural angle and channel members and includes four corner posts 52, two being arranged on either side of the open housing above the floor. The posts are connected by upper and intermediate pairs of cross members 53 and 54 respectively extending transversely of the housing 28. The members 53 and 54 are in turn connected together by angle members 55 extending longitudinally of the housing. The upper ends of the uprights 33 are preferably connected to the outside intermediate cross bar 54. The drive sprocket 21 for the transfer conveyer, as shown in Figs. 1, 2 and 5, is secured on the lower end of a vertical shaft 56 journaled in bearings 57 mounted on the members 55, and is so located that the outer run of the chain 20 where it passes around the sprocket is directly above the decline conveyer 11. Sprocket 21 is driven through bevel gears 58 on the shaft 56 and on a horizontal jack shaft 59 journaled in suitable bearings and driven by a sprocket chain 60 on sprockets 61 and 62 on the shafts 46 and 59 respectively.

The frame 13 of the transfer conveyer is also preferably formed of structural elements and comprises corner posts 63, two being on either side of the conveyer 10; upper and intermediate horizontal cross members 64 and 65 arranged transversely of the conveyer and connected to the corner posts; and upper and intermediate pairs of cross members 66 and 67 extending longitudinally of the conveyer and connected to the members 64 and 65 respectively. The sprocket 22 for the chain 20 is secured on a vertical shaft 68 journaled in bearings 69 and 70 slidably mounted between the cross members 66 and 67 respectively. The bearings may be adjusted by means of bolts 71 to take up slack in the chain 20. The sprocket 22 is so mounted that the outer run of the chain 20 where it leaves the sprocket is directly above the conveyer 10.

The guides 14 and 15, which guide the ice cakes or other articles while on the transfer conveyer, are preferably formed of metal strips, there being two such strips for each guide, as shown in Fig. 5, one to engage the ice cake near the top and the other near the bottom. The guides are curved to guide the ice cakes in an arcuate path from the conveyer 10 to conveyer 11, and are spaced farther apart at their mid-portions than at their ends to accommodate the rectangular ice cakes while rounding the curve. The front ends of the guides 15 are secured to the front outer corner post 63, and the front ends of guides 14 are secured to an intermediate upright 72 at the front of the frame 13. The rear ends of the lower guides 14, 15 are secured in recesses in the ends of the guides 36 (Fig. 4) and the rear ends of the upper guides 14, 15 are offset and connected to the uprights 33, the inner faces of both the upper and lower guides 14 and 15 being flush with the inner faces of the guides 36.

In order that the ice cakes may slide easily from conveyer 10 to conveyer 11, a portion of the side wall curbing of the housing 28 adjacent the frame 13 and also a portion of the adjacent end wall curbing are cut off flush with the level of the floor, as indicated at 73, Figs. 2, 4 and 5. A metal skid plate 74 extends between these cut away portions and the adjacent ice slide 34 to bridge the opening therebetween.

The transfer conveyer chain 20, as before mentioned, travels in a horizontal plane above the ice cakes, and in order to support the chain, some of the links are provided with hangers 75 (Figs. 6 and 7) by means of which they are suspended on wheels 76 arranged on opposite sides of the chain. The wheels 76 travel on the chain guides 16, 17, 18 and 19, which are curved to guide the chain in substantially the same path that the ice cakes follow when passing between the ice guides 14 and 15. The chain guides are all preferably made of angle members and are arranged in pairs, the guides 16 and 17 being for the inner run of the chain and the guides 18 and 19 for the outer run. The angle members of each pair have their depending vertical flanges spaced apart to permit the conventional rollers 77 of the chain to pass freely between them. The other flanges of the angle members extend horizontally in opposite directions and serve as supporting tracks for the wheels 76. The ends of the inside guides 17 and 18 terminate short of the sprockets 21 and 22 and are connected to the adjacent inner portions of the frames 12 and 13, while the ends of the outside guides 16 and 19 extend beyond the sprockets 21 and 22 on opposite sides thereof to the outer ends of the frames 12 and 13 to which they are connected. The flights 23 on conveyer 20 are spaced apart the same distance as the flights on the other conveyers. In this instance, there are three flights on chain 20, each being in the form of a depending post 78 (Figs. 6 and 7) on a special lower link 79. The posts, which extend below the top of an ice cake, are preferably covered with a piece of rubber tubing 80 or the like to prevent chipping or cracking of the ice. The flights 23 are each preferably arranged directly beneath a hanger 75.

In Fig. 1, the relations between the flights on the three conveyers are shown diagrammatically. On chain 10 there are flights at $26^a$ and $26^{a\prime}$, on conveyer 11 at $35^a$ and $35^{a\prime}$ and on conveyer 20 at $23^a$, $23^{a\prime}$ and $23^{a\prime\prime}$. The letters $b$, $b'$ etc. indicate the relative positions of corresponding flights on the respective conveyers as they advance. For instance, when flight $26^a$ moves to point $b$, flights $23^a$ and $35^a$, of the other conveyers will be at the point $b$ on their respective conveyers. An ice cake approaches the transfer conveyer from the right, as viewed in Fig. 1, being guided between the members 27 and pushed at the bottom by one of the flights on conveyer 10. As it enters the receiving end of the transfer conveyer, the forward end of the ice cake is guided between the curved guides 14 and 15. As the rear end of the ice cakes pass sprocket 22, a flight 23 on chain 20 comes in behind the cake at the top and continues to push the cake around the curve between the guides 14 and 15. As the cake moves around the curve, a flight 35 on the decline conveyer 11 comes in and moves ahead of the cake, so that when the flight on conveyer 20 pushes the cake far enough so that the ice will start down the decline by gravity, the flight on chain 11 will retard its movement and lower it to the floor below at the proper speed.

Assuming that an ice cake, as shown in dotted lines in Fig. 1, is being pushed by flight $26^a$, the flight $23^a$ will come in behind the cake as the cake passes the sprocket 22. Flight $35^a$ on conveyer 11 is then just ahead of the cake. As the flight $26^a$ reaches a point between $c$ and $d$, it becomes disengaged from the cake and the flight $23^a$ then engages it and continues to push it around the curve. Flight $35^a$ continues to move in front of the cake and is engaged by the cake as the cake passes under the sprocket 21 and starts by gravity down the slides 34.

It will be noted that while the sprockets 21 and 22 are the same size, they are smaller than the sprockets 25 and 30. Therefore, the sprocket 62 is made smaller than sprocket 61 in the same proportion in order that the transfer conveyer may travel at the same speed on the other two conveyers.

It is apparent from the foregoing description that the improved transfer conveyer will transfer ice blocks, or other articles such as boxes, etc., from one conveyer to another at an angle thereto automatically and efficiently without any labor or supervision at the transfer point. While the installation here illustrated includes a decline conveyer, it is obvious that the transfer conveyer can also be arranged to transfer articles from a single chain flight conveyer to another of the same type or to a slat conveyer, that is, one without flights.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In combination with an endless chain flight conveyer, a second conveyer extending at an angle thereto; means to guide articles from one conveyer to the other at the junction thereof; a third chain conveyer at the junction of the two conveyers having means to engage in rear of the articles being guided automatically to transfer articles from the first to the second conveyer, and synchronized with the first conveyer; and power-actuated means for driving all three conveyers.

2. In combination with a conveyer having upwardly extending flights; a second conveyer extending at an angle thereto; the junction of the two conveyers being on the same horizontal plane; a third endless conveyer supported above the first two conveyers and having depending flights adapted to engage articles on the first conveyer and transfer them to the second conveyer; means to guide the articles as they are being transferred and means for driving all three of the conveyers in synchronism.

3. In combination with a chain flight main conveyer, a second conveyer extending at an angle to the main conveyer and having one end adjacent to and on the same horizontal plane as the main conveyer; an article slide between the main conveyer and the adjacent end of the second conveyer; and mechanically driven means mounted above said conveyers near their junction to transfer articles from the main conveyer to the second conveyer; and means to guide the articles as they are transferred.

4. In combination with a single flight chain conveyer, a second conveyer having its receiving end adjacent to and on the same horizontal plane as the discharge end of the first conveyer; arcuate guide means extending between the adjacent ends of the conveyers, a transfer conveyer mounted to travel in an arcuate horizontal plane above the adjacent ends of the first two conveyers and having depending flights adapted to engage and transfer articles from the discharge end of the first conveyer to the adjacent end of the second conveyer; and driving means so constructed and arranged as to synchronize the speeds of all the conveyers.

5. In combination with a single chain flight conveyer, a second conveyer having its end adjacent to and on the same horizontal plane as the first conveyer; a slide plate extending between the adjacent portions of the two conveyers; a transfer conveyer chain mounted to travel in a horizontal plane above the adjacent portions of the two conveyers, one run of said conveyer being adapted to travel in a curved path tangential with the center lines of both of the other conveyers; depending flights on the transfer conveyer chain adapted to push articles from the first conveyer to the second conveyer; and means for guiding the articles as they are pushed by the depending flights.

6. In combination with a straight line flight conveyer for ice cakes and the like, a second conveyer at an angle to the first conveyer and having its receiving end adjacent to the discharge end of the first conveyer; transfer mechanism comprising an arcuate endless conveyer adjacent the ends of the other conveyers to receive the ice cakes from the first conveyer and discharge them on the second conveyer; and means to synchronize the transfer conveyer with the first conveyer.

7. In combination with a conveyer having upwardly extending flights; article-supporting slides on each side of and above the conveyer; a second conveyer arranged at an angle to the first conveyer; slides on each side of and above the second conveyer and on the same horizontal plane as the slides for the first conveyer; a third conveyer supported horizontally above the first two conveyers and arranged to move in a radial path; depending flights on the third conveyer adapted to engage articles on the first conveyer and transfer them to the second conveyer; guides for guiding the articles in a curved horizontal path while being transferred; a slide connecting the slides of the first conveyer and the slides of the second conveyer; and means for driving the first and third conveyers in synchronism.

8. In combination with a main conveyer having flights, article-supporting slides on each side of the conveyer above the conveyer flights on the main conveyer extending above the slides to engage and push articles along the slides; a second conveyer having one end adjacent to and arranged at an angle to the main conveyer; said adjacent end being on the same horizontal plane as the main conveyer; a frame straddling each conveyer near the junction of the two conveyers; a vertical shaft journalled in each frame; a chain sprocket on each shaft; an endless transfer conveyer chain trained around the sprockets; means for supporting and guiding one run of the transfer conveyer chain in an arcuate horizontal path from the main conveyer frame to the other conveyer frame; said run being directly above the first two conveyers where it engages its sprockets; depending flights on the transfer conveyer chain adapted to engage the upper portions of the articles and push the articles from the main conveyer to the second conveyer; and means for guiding the articles as they are pushed.

9. In combination with a floor having a straight recess therein; a main conveyer chain adapted to travel in the recess below the level of the floor; rigid flights on said conveyer extending above the floor and adapted to push articles along the floor; spaced means for guiding articles parallel with the chain; a second conveyer below the level of the floor at an angle to the main conveyer and adapted to convey articles away from the main conveyer; said second conveyer having one end adjacent to the main conveyer; article slides on each side of the second conveyer and having their ends adjacent to the main conveyer on the level of the floor; spaced means for guiding the articles parallel with the second conveyer; spaced guide means extending in an arcuate horizontal path from the main conveyer guide means to the second conveyer guide means; a transfer conveyer chain having one run mounted for arcuate horizontal travel above the spaced guide means; said run having one end above the main conveyer and the other above the second conveyer; depending flights on the transfer conveyer adapted to engage the upper rear portions of the article and push them between the spaced guide means; and common means for driving all the conveyers at the same speed.

10. In combination with a straight line flight conveyer for ice cakes and the like, a second conveyer at an angle to the first conveyer and having its receiving end adjacent to the discharge end of the first conveyer; spaced arcuate ice guide means extending above and between the two conveyers near their ends; a sprocket mounted above each end of the guide means; an endless chain on the sprockets; means to guide one run of the chain in an arcuate path between the guide means; depending flights on the chain adapted to engage and transfer the ice between the guide means from the first conveyer to the second conveyer; and means to drive the conveyers and the chain in synchronism.

11. In combination with a straight line flight conveyer for ice cakes and the like; a second conveyer at an angle to the first conveyer and having its receiving end adjacent to the discharge end of the first conveyer; a frame above each conveyer near their adjacent ends; spaced arcuate ice guides extending between the frames above the conveyers and having their ends straddling the conveyers; a vertical shaft mounted in each frame; a sprocket on each shaft; an endless chain on the sprockets; means to support and guide one run of the chain in an arcuate path above and between the ice guides; means for driving said run in the same direction as the conveyers; depending flights on the chain to engage and transfer the ice from the first conveyer to the second conveyer; and means for synchronizing the endless chain and the first conveyer.

12. In combination with a straight line flight conveyer for ice cakes and the like; a second conveyer at an angle to the first conveyer and having its receiving end adjacent to the discharge end of the first conveyer; a frame above each conveyer near their adjacent ends; spaced arcuate ice guides extending between the frame above the conveyers and having their ends straddling the conveyers; a vertical shaft mounted in each frame; a sprocket on each shaft; an endless chain on the sprockets; curved arcuate angle members on each side of each run of the chain; said members extending between the frames; upstanding hanger members on some of the links of the chain; a transverse shaft extending through each hanger; a wheel journalled on each end of the shaft and engageable with the tops of the angle members on each side of the chain to support and guide the chain in a curved path between the sprockets; one run of said chain being arranged tangentially of the vertical planes of both conveyers; means for driving said run in the directions of the two conveyers and in synchronism with the first conveyer; and depending flights on the chain to engage the upper portions of the ice cakes and transfer them from the first conveyer to the second conveyer.

13. In combination with a straight line conveyer for ice cakes and the like, said conveyer having upwardly extending flights adapted to engage the rear lower ends of the ice cakes; a second conveyer arranged at an angle to the first conveyer and having its receiving end adjacent to the discharge end of the first conveyer; spaced guide means extending between the adjacent ends of the conveyers; transfer mechanism including an endless conveyer mounted to travel in a horizontal plane above the ice cakes and being adjacent to the adjacent ends of the other conveyers; said endless conveyer having depending flights to engage the upper rear portions of the ice cakes on the first conveyer and push them between the guide means onto the second conveyer; and means for driving all three of the conveyers in synchronism.

14. In combination with a straight line flight conveyer for ice cakes and the like; a second conveyer having its receiving end adjacent to the discharge end of the first conveyer, but extending at an angle to the first conveyer; transfer mechanism comprising an endless conveyer adjacent to the ends of the other conveyers to receive the ice cakes from the first conveyer and discharge them on the second conveyer; means to guide the ice cakes end first as they are being moved by all three conveyers; and means to synchronize the transfer conveyer with the first conveyer.

In testimony, that I claim the foregoing as my own, I have hereto affixed my signature.

STANLEY H. DURBIN.